(12) United States Patent
Mueller et al.

(10) Patent No.: US 7,662,320 B2
(45) Date of Patent: Feb. 16, 2010

(54) METHOD AND DEVICE FOR SEPARATING PASTY MATERIALS

(75) Inventors: Ulrich Mueller, Neustadt (DE); Jan Mueller, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 598 days.

(21) Appl. No.: 10/543,497

(22) PCT Filed: Feb. 4, 2004

(86) PCT No.: PCT/EP2004/001004

§ 371 (c)(1),
(2), (4) Date: Jul. 27, 2005

(87) PCT Pub. No.: WO2004/069507

PCT Pub. Date: Aug. 19, 2004

(65) Prior Publication Data

US 2006/0148641 A1    Jul. 6, 2006

(30) Foreign Application Priority Data

Feb. 5, 2003    (DE) .............................. 103 04 611

(51) Int. Cl.
*B29C 49/08* (2006.01)
*C01B 39/02* (2006.01)

(52) U.S. Cl. .................. 264/82; 264/143; 264/628; 264/638; 264/640; 264/646; 264/142; 423/700

(58) Field of Classification Search ............... 423/700; 264/142, 500, 628, 638, 640, 143, 82, 646
See application file for complete search history.

(56) References Cited

U.S. PATENT DOCUMENTS

| | | | | | |
|---|---|---|---|---|---|
| 3,154,603 | A | * | 10/1964 | Whitheford et al. | ........... 264/15 |
| 3,846,529 | A | * | 11/1974 | Poteet, III | .................. 264/142 |
| 4,725,391 | A | * | 2/1988 | Bardhan et al. | ............... 264/82 |
| 4,776,998 | A | | 10/1988 | Davidson et al. | |
| 5,063,002 | A | * | 11/1991 | Luker | ........................... 264/12 |
| 5,147,593 | A | * | 9/1992 | Huttllin | ...................... 264/500 |
| 5,188,782 | A | * | 2/1993 | Bittler et al. | ................... 264/82 |
| 5,443,771 | A | * | 8/1995 | Gupta | ........................ 264/82 |

FOREIGN PATENT DOCUMENTS

| | | |
|---|---|---|
| EP | 0 311 983 | 4/1989 |
| EP | 0 405 978 | 1/1991 |
| EP | 0 830 927 | 3/1998 |
| WO | 98/55228 | 12/1998 |
| WO | 98/55229 | 12/1998 |
| WO | 98/55430 | 12/1998 |

OTHER PUBLICATIONS

Meier, W.M. et al. "Atlas of Zeolite Stucture Types", Zeolites, vol. 17, 4th edition, pp. A3-A5 1996.

* cited by examiner

*Primary Examiner*—David M Brunsman
(74) *Attorney, Agent, or Firm*—Oblon, Spivak, McClelland, Maier & Neustadt, L.L.P.

(57) ABSTRACT

A pasty molding material is divided by a process wherein, for the division, the pasty molding material is brought into contact with at least on stream containing at least one fluid medium.

7 Claims, No Drawings

METHOD AND DEVICE FOR SEPARATING PASTY MATERIALS

This application is a 371 of PCT/EP04/01004, filed Feb. 4, 2004.

The present invention relates to a process for the division of pasty molding materials. The division of these materials is effected by bringing the molding materials into contact with a stream which contains at least one fluid medium.

In industrial processes, process steps in which pasty materials have to be divided frequently occur. Such processes are used, for example, in mass production of plastics products, pharmaceutical products, cleaning agents and personal hygiene compositions, foods, animal feeds or catalysts, in which pasty materials are molded.

Examples are, inter alia, extrusion processes in which pasty materials are processed in an extrusion apparatus and are brought into a form required by process engineering or for use. Usually, a die whose geometry determines the diameter and the cross-sectional shape of the molding leaving the extrusion apparatus is mounted at the exit of the extrusion apparatus. In this way, for example, extrudates or hollow extrudates having a wide range of diameters, cross-sectional shapes and geometries are obtained.

For dividing the pasty materials and hence for establishing the length of the moldings, the extrusion apparatuses are equipped with face-cutting apparatuses which cut to length a continuous molding emerging from the extrusion apparatus. As a rule, this cutting to length is effected by means of face-cutting or cutting tools, these tools generally being produced from metal, ceramic, plastic or corresponding composition materials.

A considerable disadvantage of these conventional methods for cutting to length is that the tools are subject to natural wear as a result of the division of the pasty molding materials. Repairs and replacement of the tools and frequent downtimes are the consequence.

Further disadvantages occur in particular in the case of molding materials of high viscosity or very inhomogeneous consistency. Deposits of parts of the molding materials on the tools, which inevitably occur during the division process, result, on the one hand, in losses of product. On the other hand, these deposits also necessitate the cleaning of the tools, which may be frequent under certain circumstances.

In the case of relatively soft molding materials, there is the disadvantage that, after the division using conventional tools, a part of the molding material which has been separated off frequently remains adhering to the remainder of the molding material, having an extremely adverse effect on the product quality or even making the products unusable.

The risk of contamination of molding materials by abraded materials and discharges of the gradually wearing tools may be mentioned as a further disadvantage, which occurs in particular in the case of molding materials which contain sensitive components. In such a case, an investigation of the products must follow in order to counteract the risk of further processing contaminated molding materials or bringing them onto the market. Choosing only completely safe tools is an alternative, which may entail considerable research activities and capital costs.

It is an object of the present invention to remedy these disadvantages occurring in conventional processes.

We have found that this object is achieved by a process for the division of a pasty molding material, wherein, for the division, the pasty molding material is brought into contact with at least one stream containing at least one fluid medium.

The term "division" as used in the context of the present invention includes, on the one hand, procedures in which a part is completely separated off from the molding material by bringing the pasty molding material into contact with the stream containing the at least one fluid medium. The cutting to length of a strand of a molding material may be mentioned as an example of this complete separation. The term "division" also includes procedures in which said stream is brought into contact with the molding material in such a way that the molding material is not completely divided. In the latter embodiment, for example, an incision can be made in a molding material strand by means of the stream, the depth of the cut being chosen so that the molding material strand remains in the form of an integral piece.

The term "molding material" as used in the context of the present invention includes materials which are subjected to at least one shaping step. This includes procedures in which the molding material is divided according to the invention in the shaping step. Before the division according to the invention or after the division according to the invention or both before and after the division according to the invention, the pasty molding material can be subjected to at least one further shaping step.

Thus, as further shaping steps, it is possible to provide, for example, one or more further division steps which are carried out either according to the invention by means of a stream containing at least one fluid medium or by conventional methods of the prior art, for example by means of a mechanical division.

Shaping processes differing from division processes are also possible as further shaping steps. For example, a strand of a molding material can be modified by shaping in such a way that, for example, its length and/or its diameter and/or its cross section is changed. It is also possible, for example, for a piece of a molding material, for example of a molding material strand, which has been separated off and results from a novel division process to be modified in at least one of its geometrical properties, for example by kneading, rolling, compaction, drawing or other processes. The molding material or the piece of a molding material which results from the novel division process can be subjected to shaping effects also by, for example, one or more drying and/or heating processes or by one or more chemical processes.

A procedure in which, in the division step, the bringing of a pasty molding material into contact with a stream containing at least one fluid medium is combined in a suitable manner with one or more conventional division processes according to the prior art may also be mentioned as a possible embodiment of the novel process. Thus, it is conceivable inter alia that, as described above, by means of the novel process, for example a pasty molding material strand is provided with one or more incisions while retaining its integral nature and at least one of these incisions is completely cut through by one or more conventional tools. A converse procedure in which the pasty molding material strand is provided with at least one incision by means of one or more conventional tools while retaining its integral nature and at least one of these incisions is completely cut through by means of the novel process is also possible.

In the context of the present invention, the term "fluid medium" is understood as meaning all states of material which are between ideal gas and solid under the conditions prevailing during the division. Accordingly, the term fluid medium covers, for example, dense gases, liquids, melts or supercritical phases. In the context of the present invention, finely divided solids in one or more gases or liquids, for example fluidized beds or magnetic liquids, also constitute fluid media. In the novel process, gases or liquids are preferably used as fluid media.

Accordingly, the present invention also relates to a process, as described above, wherein the fluid medium is a gas or a liquid.

For the purposes of the present invention, two or more different fluid media may also be used. In this respect, for example, the stream which is used for division of the pasty molding material may contain two or more different fluid media, for example two or more different gases or two or more different liquids or at least one gas and at least one liquid being conceivable.

In a further embodiment of the novel process, two or more streams containing at least one fluid medium are used for the division of the pasty molding material.

This embodiment in which two or more streams are used includes, inter alia, those procedures which employ two or more streams, at least two of which differ in their composition. Different compositions can be achieved, inter alia, if at least two of the streams contain different fluid media. Different compositions can furthermore be achieved if the streams contain the same fluid media but the concentrations in the individual streams differ with respect to the fluid media or the streams differ in further components other than the fluid media.

In a particularly preferred embodiment of the novel process, the stream which is brought into contact with the pasty molding material consists of the at least one fluid medium.

Regarding the bringing of the stream containing at least one fluid medium into contact with the pasty molding material, all suitable procedures are possible.

In a preferred embodiment, the stream is brought, under a certain pressure, at a certain volume flow rate and a certain temperature of the stream, in a certain direction and with a certain cross-sectional area and geometry, continuously into contact with the molding material under certain ambient conditions. In this context, the term continuous is understood as meaning all procedures in which, in the course of a single division process, the molding material is permanently in contact with the stream containing at least one fluid medium.

This embodiment of bringing into contact continuously includes, inter alia, those procedures in which the stream is fed with constant pressure, constant temperature, constant volume per unit time, constant direction and constant cross-sectional area and geometry to the molding. This embodiment in turn includes, inter alia, those procedures in which said parameters of the stream containing at least one fluid medium are constant at the outlet apparatus via which the stream is fed to the molding material, as well as procedures in which these parameters are constant at the respective surface of the molding material. Regarding the last two embodiments, it is accordingly conceivable for the outlet orifice via which the stream is fed to the molding material to remain in a constant position relative to the molding material. Here, the parameters of the stream at the surface of the molding material and of the outlet orifice are constant. It is also possible for the position of the outlet orifice of the stream to change relative to the molding material in the course of the division process, with the result that the stream parameters at the surface of the molding material can be changed with constant stream parameters at the outlet orifice and, in the case of variable stream parameters of the outlet orifice, the stream parameters at the surface of the molding material can be kept constant.

The stream may also be fed batchwise to the molding material. This embodiment includes, inter alia, those procedures in which the pasty molding material is permanently in contact with the stream containing at least one fluid medium in the course of a single division process, while at least one of the variable parameters of this stream which are described above is changed in the course of time. Thus, it is conceivable, for example, for the pressure at which the stream is discharged or the pressure at which the stream strikes the pasty molding material to change in the course of this single division process. The same applies to the parameters described above, such as volume flow rate, temperature of the stream, cross-sectional area and geometry and direction. Of course, the composition of the stream may also be changed in the course of time.

Apparatuses comprising the above-mentioned outlet orifice are, for example, nozzles. Nozzles preferred among others in the novel process are, for example, fan-jet nozzles, which may be distinguished, for example, by uniform liquid and pressure distribution of the discharged stream, it also being possible to use those nozzles which have a specific distribution of the fluid medium in the discharged stream. Examples of such distributions are, inter alia, parabolic or trapezoidal distributions. For example, low-pressure or high-pressure nozzles very generally can be used as liquid or air nozzles or as both liquid and air nozzles. Depending on the fluid medium and/or the process conditions, it is possible to use nozzles which consist of materials such as metals, e.g. brass, acid-resistant steel, heat-resistant steel or titanium, plastics, such as polyvinyl chloride (PVC), polypropylene (PP) or Hastelloy, or two or more of these materials. Nozzles of the type described above are commercially available, for example from Lechler or Schlick.

In the context of the present invention, the term "a single addition process" is understood as meaning procedures in which part of a pasty molding material is completely separated off from the remainder of the molding material or, for example, an incision is made in the molding material while retaining the integral nature of the molding material.

In a preferred embodiment of the present invention, a strand of a pasty molding material is periodically cut to length. For example, the strand of the molding material can be moved at a constant feed speed past one or more stationary outlet apparatuses through which one or more streams containing at least one fluid medium are discharged and brought into contact with the strand. The length of the pieces which are separated off from the strand can be regulated by means of the frequency with which the stream is discharged. Thus, it is conceivable, inter alia, for this pulse frequency also to be kept constant at constant feed speed of the strand with the result that, for example, strand pieces of equal length are obtained. It is also possible to change the pulse frequency as a function of time at constant feed speed, with the result that strand pieces of defined different length are obtained. It is also possible to change the feed speed continuously or discontinuously as a function of time and to keep the pulse frequency constant or to change it continuously or discontinuously as a function of time. It is also conceivable for the at least one outlet orifice for the stream containing at least one fluid medium to be nonstationary. Here, the at least one outlet orifice can be mounted, for example, on at least one displaceably arranged arm which moves parallel to the extrudate of molding material or in directions deviating therefrom. For each stream brought into contact with the molding material during a pulse, the continuous and discontinuous procedures described above with regard to the application of the stream to the molding material are conceivable.

Accordingly, the present invention also relates to a process, as described above, wherein a strand of a pasty molding material is periodically divided.

Procedures in which a plurality of strands is simultaneously cut to length are of course also conceivable. For example, such a plurality of strands is particularly preferably formed in an extrusion apparatus.

In a particularly preferred embodiment of the present invention, in which, for example, a continuous strand of a pasty molding material is completely separated off by the stream containing at least one fluid medium, with the result that the continuous strand is cut to length, there is a considerable advantage which the novel process has over the conventional mechanical division tools, for example wires for cutting to length. By using the fluid medium, the pulse frequency with which the stream is brought into contact with the molding material can be controlled in a substantially more reproducible manner than was the case to date. Consequently, the length of the strand pieces separated off from the molding material strand can also be adjusted in a more reproducible manner, from which applications in which a very homogeneous plurality of strand pieces is required benefit in particular. If, for example, a pasty molding material is divided in order to produce bulk material which is to be used with a high bulk density, the novel process is particularly advantageous since, in comparison with conventional processes of the prior art, it reduces off-spec fragments or fines, or both fragments and fines, by the superior division process.

Accordingly, the present invention also relates to the use of a fluid medium for producing bulk material of high bulk density by periodically constant division of a pasty molding material.

The present invention also relates to the bulk material itself, which can be produced by a process as described above, where catalyst moldings may be mentioned as particularly preferred bulk material in the context of the present application.

In particularly preferred embodiments, the bulk density of the bulk material which can be produced according to the invention is from 0.1 to 10 $g/cm^3$, more particularly preferably from 0.2 to 2 $g/cm^3$, more preferably from 0.3 to 1 $g/cm^3$, and particularly preferably from 0.4 to 1 $g/cm^3$.

In principle, all conceivable pasty molding materials whose viscosity, with an appropriate choice of the properties of the stream containing at least one fluid medium, and other process parameters, permits a division by the stream can be divided in the novel process. Examples of such properties of the stream are:

composition of the stream;
pressure at which the stream comes into contact with the molding material;
temperature of the stream;
volume of the stream which is applied to the molding material per unit time and unit cross section;
cross section of the contact surface between stream and molding material;
geometry of the contact surface between stream and molding material;
direction in which the stream strikes the molding material;
frequency with which the stream is applied to the molding material;
distribution of the fluid medium in the stream.

In general, the pasty molding materials which can be processed in the novel process are not subject to any further restrictions. The viscosity of the molding materials is in general from 300 to 5 000 $N/cm^2$, preferably from 500 to 4 000 $N/cm^2$, particularly preferably from 1 000 to 3 000 $N/cm^2$. Such pasty molding materials are obtained, for example, in the production or mass production of plastics products, pharmaceutical products, cleaning agents and personal hygiene compositions, food products, animal feeds or catalysts.

Viscosity data stated in the context of the present Application are understood as meaning values determined using a Zwick material tester of the type Z010/TN2S, equipped with the standard software testXpert. The measuring head (10 kN) originates from GTM, Gassmann & Theiss, Messgerätetechnik, with a test certificate from Zwick. The measuring apparatus has a measuring cylinder with a maximum capacity of 40 $cm^3$ as the lower part and a load cell (10 kN) with a ball attachment as the upper part.

In a very particularly preferred embodiment, the novel process is used for molding materials whose viscosity is from 1 000 to 3 000 $N/cm^2$. Pasty molding materials which have such viscosities are used, for example, in the production of catalyst moldings.

In the context of the present invention, the term "catalyst molding" is understood as meaning moldings which serve as a prepared catalyst or as a catalyst precursor. Furthermore, catalyst moldings may have at least one further component which does not have catalytic activity and, in the case of a catalyst precursor, can be removed from the molding, for example, in at least one further treatment step, for example in a thermal treatment or a chemical reaction.

Examples of such catalysts are, inter alia, oxidation, hydrogenation, dehydrogenation, epoxidation, amination, alkylation, purification or reforming catalysts. Catalysts for removing oxides of nitrogen $NO_x$ or for decomposing $N_2O$ may also be mentioned.

In an embodiment of the novel process which is preferred among others, epoxidation catalyst moldings are prepared, zeolite catalysts in turn being preferred as epoxidation catalysts. There are no particular restrictions with regard to the zeolite catalyst moldings which can be prepared in the present invention.

Zeolites are known to be crystalline aluminosilicates having ordered channel and cage structures which possess micropores which are preferably smaller than about 0.9 nm. The network of such zeolites is composed of $SiO_4$ and $AlO_4$ tetrahedra which are linked via common oxygen bridges. An overview of the known structures is to be found, for example, in W. M. Meier, D. H. Olson and Ch. Baerlocher, Atlas of Zeolite Structure Types, Elsevier, 4th Edition, London, 1996. Zeolites which contain no aluminum and in which titanium in the form of Ti(IV) is present instead of some of the Si(IV) in the silicate lattice are now also known. These titanium zeolites, in particular those having a crystal structure of the MFI type, and possibilities for their preparation, are described, for example in EP-A 0 311 983 or EP-A 405 978. In addition to silicon and titanium, such materials may also contain additional elements, for example aluminum, zirconium, tin, iron, cobalt, nickel, gallium, boron or small amounts of fluorine. In the zeolite catalysts preferably regenerated using the novel process, some or all of the titanium of the zeolite can be replaced by vanadium, zirconium, chromium or niobium or a mixture of two or more thereof. The molar ratio of titanium and/or vanadium, zirconium, chromium or niobium to the sum of silicon and titanium and/or of vanadium and/or zirconium and/or chromium and/or niobium is as a rule from 0.01:1 to 0.1:1.

Titanium zeolites, in particular those having a crystal structure of the MFI type, and possibilities for their preparation, are described, for example, in WO 98/55228, WO 98/55229, WO 98/55430, EP-A-0 311 983 or EP-A-0 405 978, the scope of which in this respect is hereby fully incorporated by reference in the context of the present Application. Titanium zeolites having the MFI structure are known to be capable of being identified from a certain pattern in the determination of their X-ray diffraction pictures and additionally from a skeletal vibration band in the infrared range (IR) at about 960 cm$^{-1}$ and therefore differ from alkali metal titanates or crystalline and amorphous $TiO_2$ phases.

These include specifically titanium-, germanium-, tellurium-, vanadium-, chromium-, niobium- and zirconium-containing zeolites having the pentasil zeolite structure, in particular the types assigned, by X-ray diffraction, to the ABW, ACO, AEI, AEL, AEN, AET, AFG, AFI, AFN, AFO, AFR, AFS, AFT, AFX, AFY, AHT, ANA, APC, APD, AST, ATN, ATO, ATS, ATT, ATV, AWO, AWW, BEA, BIK, BOG, BPH, BRE, CAN, CAS, CFI, CGF, CGS, CHA, CHI, CLO, CON, CZP, DAC, DDR, DFO, DFT, DOH, DON, EAB, EDI, EMT, EPI, ERI, ESV, EUO, FAU, FER, GIS, GME, GOO, HEU, IFR, ISV, ITE, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAT, NES, NON, OFF, OSI, PAR, PAU, PHI, RHO, RON, RSN, RTE, RTH, RUT, SAO, SAT, SBE, SBS, SBT, SFF, SGT, SOD, STF, STI, STT, TER, THO, TON, TSC, VET, VFI, VNI, VSV, WIE, WEN, YUG or ZON structure and mixed structures comprising two or more of the above-mentioned structures. Titanium-containing zeolites having the structure of ITQ-4, SSZ-24, TTM-1, UTD-1, CIT-1 or CIT-5 are furthermore conceivable for use in the novel process. Further titanium-containing zeolites which may be mentioned are those having the structure of ZMS-48 or ZSM-12.

Moldings of Ti zeolite catalysts having the MFI, MEL or MFI/MEL mixed structure are preferably used in the novel process. Specifically, the Ti-containing zeolite catalysts, which are generally referred to as TSI-1, TS-2 or TS-3, and Ti zeolites having a framework structure isomorphous with β-zeolite may furthermore be mentioned as being preferred.

The present invention accordingly also relates to a process as described above, wherein the pasty molding material comprises a titanium zeolite catalyst.

The novel process is particularly advantageous, inter alia, for the production of catalyst moldings which are to achieve a high bulk density, since, as stated above, the division of the pasty molding material by means of a jet containing at least one fluid medium gives bulk material having a higher bulk density in comparison with conventional mechanical processes.

Catalysts having a high bulk density are, for example, epoxidation catalysts which are used in a process for the preparation of alkylene oxides, for example propylene oxide. Particularly preferred epoxidation catalysts are, for example, the above-mentioned zeolite catalysts, particularly preferably the titanium zeolite catalysts.

The bulk density of these epoxidation catalysts which for example are preferred is, for example, particularly preferably from 0.4 to 1 g/cm$^3$.

Accordingly, the present invention also describes a process, as described above for preparing a bulk material, wherein the bulk material, in particular catalyst moldings, has a bulk density of from 0.1 to 10 g/cm$^3$, more particularly preferably from 0.2 to 2 g/cm$^3$, more preferably from 0.3 to 1 g/cm$^3$, and particularly preferably from 0.4 to 1 g/cm$^3$.

The present invention also describes the use of a novel apparatus for the preparation of catalyst moldings having a bulk density of from 0.1 to 10 g/cm$^3$, more particularly preferably from 0.2 to 2 g/cm$^3$, more preferably from 0.3 to 1 g/cm$^3$, and particularly preferably from 0.4 to 1 g/cm$^3$.

In the novel process, the parameters which define the stream and are described above can be adapted to the parameters of the pasty molding material to be divided, for example
viscosity;
geometry;
feed speed (in the case of a moving molding material);
composition.

If the chemical composition of the pasty molding material permits, for example, nitrogen can be used as the fluid medium. This has the advantage that, in many production processes, nitrogen is already present on site in gas networks. A stream which consists of compressed air, which is likewise generally present on site in gas networks, is also conceivable. However, other gases, including noble gases, are of course also conceivable, it being possible for the stream to contain one or more of the gases or to consist of this at least one gas.

If, in a particularly preferred embodiment of the novel process, for example, catalyst moldings comprising at least one titanium zeolite are prepared by division of pasty molding materials, a stream which consists of compressed air is preferred.

Accordingly, the present invention also relates to a process, as described above, wherein the stream substantially comprises air.

The term "air" as used in the context of the present invention is understood as meaning a gas or a gas mixture which substantially comprises nitrogen, preferably having nitrogen contents greater than or equal to 78% by volume, and is substantially present as a fixed installation in any laboratory and any production plant operated on a pilot or industrial scale. Depending on the source from which the air originates, its composition may vary within the limits familiar to a person skilled in the art.

If, for example, catalyst moldings are prepared in the novel process, it is also conceivable to use a stream which comprises at least one reactive gas. For example, the surfaces formed by the division process can be oxidized by reactive gases, for example oxygen, or reduced by hydrogen. By means of such division processes, division and chemical reaction of the surfaces forming during the division are combined in the novel process, which ensures a highly economical process.

Accordingly, the present invention also describes a process for the preparation of chemically modified moldings from a pasty molding material, wherein the pasty molding material is divided and chemically modified by a stream containing at least one fluid medium, the at least one fluid medium comprising at least one medium reactive with respect to the pasty molding materials.

The present invention also describes the use of a stream containing at least one fluid medium for the preparation of chemically modified moldings from a pasty molding material, wherein the at least one fluid medium comprises at least one medium reactive with respect to the pasty molding materials, and the pasty molding material is divided and chemically modified.

Of course, it is also possible for the novel stream used to contain one or more gases, for example noble gases and/or other gases inert with respect to the chemical composition of the molding material, in addition to the reactive gas.

In the context of this embodiment it is also possible chemically to modify not only the surfaces which form during the division process but also the other surfaces of the pasty molding material and hence of the resulting molding. This can be effected, for example, by dividing a strand of a pasty molding material by a stream containing the reactive fluid medium in a first step. In the further course, in which the pasty molding material is moved past at least one outlet apparatus via which the stream is applied to the molding material and/or the outlet apparatus is moved past the molding material, the stream is further applied to the molding material, but the pressure of the stream is reduced to such an extent that the stream comes into contact with the molding material and hence permits the chemical modification of the surface, but division no longer takes place. After a certain time in which that part of the molding material which is to be separated has the predetermined length, the pressure of the stream is then increased in such a way that a division process takes place again.

Accordingly, the present invention also describes the use described above and the process described above, the pressure at which the stream is applied to the molding material being variable.

As described above, the pressure of the stream containing the at least one fluid medium can be completely adapted to the requirements determined by the pasty molding material and the type of division process, for example complete separation or making an incision in the molding material.

If the stream used is, for example, a gas or gas mixture, pressures of from a few millibar to high pressures of up to 2 000 bar are suitable. The temperature of the gas stream may be, for example, from room temperature to 700° C.

If, for example, a catalyst molding, for example one of the catalyst moldings described above as being preferred, is produced in the course of the present invention, a gas stream which preferably substantially comprises air, in general at pressures of from 1 to 325 bar, preferably from 4 to 200 bar, particularly preferably from 10 to 100 bar, is used. The gas stream has a temperature which is generally in the range from room temperature to 200° C., preferably from room temperature to 100° C., particularly preferably from room temperature to 50° C.

Accordingly, the present invention also relates to a process, as described above, wherein the stream is brought into contact with the pasty molding material at a pressure of from 1 to 325 bar and at a temperature of from room temperature to 200° C.

It is furthermore particularly preferable if the parameters of the gas stream are chosen so that the pasty molding material is divided but is not completely broken up or deformed. The advantage of the novel process of conventional mechanical division apparatuses is once again displayed here, since pressure, temperature, volume flow rate and all other parameters of the gas stream can be optimally adapted to the consistency, for example plasticity and brittleness, of the respective pasty molding material.

If, for example, a liquid is preferably used as the stream, pressures and temperatures which are chosen to be similar to those used in water jet cutting are generally employed.

If one or more liquids are used as the fluid medium in the course of present invention, it is possible to use all liquids whose viscosity enables the flow velocity required for the desired division step to be established. If permitted by the chemical nature of the pasty molding material, for example, water is particularly preferred as a fluid medium since it is installed on site in many production facilities. In general, when a liquid is used as the fluid medium, a procedure should be adopted in which the temperature of the stream and pressure at which the stream is discharged from the respective outlet apparatus and brought into contact with the pasty molding material are adapted to the boiling point of the liquid at the corresponding pressure. In general, the procedure is effected at below the boiling point of the liquid at this pressure.

In a more preferable embodiment of the novel process, the fluid medium, particularly preferably the at least one liquid, is collected after the division step and recycled to the process. If necessary, the fluid medium can be subjected to one or more suitable purification steps or working-up steps before the recycling.

Very generally, the present invention also describes the use of at least one of the fluid media described above in the production of at least one product from at least one pasty molding materials, the at least one fluid medium having a shaping effect on at least one pasty molding material in at least one step of this at least one production process.

Accordingly, the present invention relates to the use of a fluid medium for shaping a pasty molding material.

As described above, a very particularly preferred novel area of use is the division of a pasty molding material by means of at least one stream containing at least one fluid medium.

Accordingly, the present invention also describes the use of a fluid medium, as described above, wherein the shaping comprises a division of the pasty molding material.

In particular, the present invention describes the use, as described above, wherein, as the pasty molding material, a molding material which contains at least one catalyst or at least one precursor of a catalyst or at least one catalyst and at least one precursor of a catalyst is subjected to a shaping operation, the catalyst preferably being an epoxidation catalyst, more preferably a zeolite catalyst, more particularly preferably a titanium zeolite catalyst.

The present invention is illustrated in the following examples.

EXAMPLES

Example 1

According to the Invention

In a kneader, 150 g titanium zeolite powder was mixed with 125 g silica sol Ludox AS 40, 120 g aqueous polystyrol dispersion (30% by weight polystyrol), 6 g methylcellulose, 2 g polyethylene oxide and 48 g demineralized water, and kneaded for 60 minutes. Subsequently, the resulting paste was shaped using a matrix having a diameter of bore of 1.5 mm, and a mold pressure of from 80-100 bar.

At the working face of the matrix, 2 fan nozzles (Schlick company, name 19828, mod. 650, mouth piece size 0, capacity 2.5 l/min at 3 bar, angle of dispersion 90°) were placed which were run with compressed air at 10 bar. The outgoing air jet was pulsatorily controlled by an electrovalve.

The strand green products leaving the mold were cut wherein, by combining the advance of the paste and the pulse frequency of the air jet, it was possible to adjust the length of the strands in the narrow range of from 4-8 mm.

Finally the strand green products were dried at 120° C. overnight in air and calcined at 500° C. in air for 3 hours.

The catalyst thus produced had a bulk density of 440 g/liter.

Example 2

Comparative Example

In a kneader, 150 g titanium zeolite powder was mixed with 125 g silica sol Ludox AS 40, 120 g aqueous polystyrol dispersion (30% by weight polystyrol), 6 g methylcellulose, 2 g polyethylene oxide and 48 g demineralized water, and kneaded for 60 minutes. Subsequently, the resulting paste was shaped using a matrix having a diameter of bore of 1.5 mm, and a mold pressure of from 80-100 bar.

At the working face of the matrix, a cutting tool consisting of a tense metal wire was placed which periodically oscillated along the working face. The cut off strand green products had a length of from 4-18 mm with a broad length distribution. The strands were slightly curved and partially glued together alongside.

Finally the strand green products were dried at 120° C. overnight in air and calcined at 500° C. in air for 3 hours.

The catalyst thus produced had a bulk density of only 308 g/liter.

We claim:

1. A process for the division of a pasty molding material with a viscosity of from 300 to 5 000 N/cm$^2$, wherein, for the division, at least one strand of the pasty molding material is brought into contact with at least one stream containing at least one fluid medium, wherein the stream substantially comprises at least one reactive medium, where the strand is periodically divided and wherein the length of the pieces which are separated off from the strand is regulated by means of the frequency with which the stream is discharged and wherein said at least one reactive medium is reactive with respect to the pasty moulding materials.

2. The process as claimed in claim 1, wherein the fluid medium is a gas or a liquid.

3. The process as claimed in claim 1, wherein the stream is brought into contact with the pasty molding material at a pressure of from 1 to 325 bar and at a temperature from room temperature to 200° C.

4. The process as claimed in claim 1, wherein the pasty molding material comprises a titanium zeolite catalyst.

5. The process as claimed in claim 1, wherein a bulk material with a bulk density of from 0.1 to 10 g/cm$^3$ is obtained.

6. A process for preparing a titanium zeolite catalyst molding with a bulk density of from 0.1 to 10 g/cm$^3$, wherein a strand of a pasty molding material with a viscosity of from 300 to 5 000 N/cm$^2$, comprising the titanium zeolite catalyst, is periodically divided by a stream substantially comprising at least one reactive medium at pressures from 4 to 200 bar, and wherein the length of the pieces which are separated off from the strand is regulated by means of the frequency with which the stream is discharged and wherein said at least one reactive medium is reactive with respect to the pasty moulding materials.

7. A titanium zeolite catalyst molding with a bulk density of from 0.1 to 10 g/cm$^3$, obtained by a process according to claim 6.

* * * * *